Figures 1, 2:
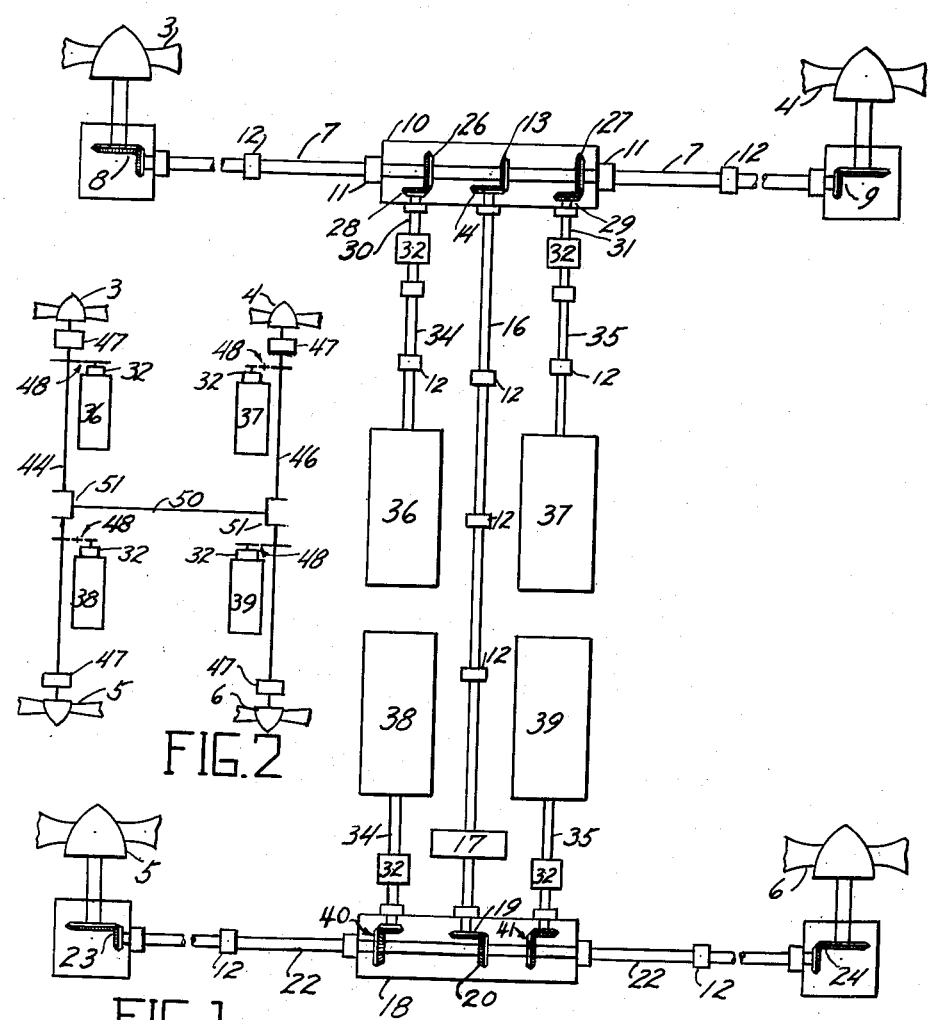

Dec. 31, 1963  R. R. BLEWS, JR  3,115,936
POWERPLANT TRANSMISSION SYSTEM
Filed Feb. 28, 1961

Inventor:
Richard R. Blews, Jr.
By William V. Ebs
Attorney.

United States Patent Office 3,115,936
Patented Dec. 31, 1963

3,115,936
POWERPLANT TRANSMISSION SYSTEM
Richard R. Blews, Jr., Montville, N.J., assignor to Curtiss-Wright Corporation, a corporation of Delaware
Filed Feb. 28, 1961, Ser. No. 92,310
3 Claims. (Cl. 170—135.2)

This invention relates to a powerplant system incorporating multiple prime movers and multiple driven loads, wherein the driven loads are interconnected to run in unison.

In certain types of aircraft and other equipment having multiple engines or motors to provide adequate power and reliability, a plurality of driven elements are incorporated which are all interconnected so that they operate together, frequently at the same speed but also at different speeds according to drive ratios. In such systems it is desirable to enable system operation with less than the full complement of engines in case of failure of one or more engines. Also, it is desirable to arrange the powerplant system so that the driving interconnections or intershafting are arranged for greatest efficiency in power transmission, minimizing the size and weight of intershafting.

Objects of the present invention are:

To provide an interconnected multiple powerplant and load system wherein all or part of the prime movers may be operated to drive the system; to provide an interconnected load system wherein all loads operate in unison and wherein all are driven by those prime movers of the system which are in operation.

To provide means by which one or more prime movers can be shut down or stopped without affecting power transmission from other engines or prime movers to the loads and to transmit the partial available power in as efficient a manner as possible.

To provide configurations for powerplant and driven load arrangements which enable maximum operation flexibility.

To provide a multiple engine and multiple propeller system for aircraft wherein the engines and propellers are all interconnected to enable drive of the propellers in unison and to enable the propeller drive by all or part of the complement of engines associated in the system.

Systems, according to the invention, are shown in the attached drawings wherein similar reference characters indicate similar parts. These drawings are to be construed only as exemplary of the invention and are susceptible to many modifications.

In the drawings:

FIG. 1 is a schematic elevation of a power system according to the invention and FIG. 2 is a simplified diagram of an alternative embodiment of the invention.

Referring first to FIG. 1, driven loads in the form of aircraft propellers are shown at 3, 4, 5, and 6, these being more or less quadrilaterally arranged. The environment for this system is not shown, but it can be envisioned that these propellers would be suitably arranged, for instance, in an aircraft. It may be assumed as a requirement that all propellers 3–6 be driven in unison and for this purpose, they are interconnected by power transmission shafting. Propellers 3 and 4 are drivably connected to one another by a transverse shaft 7, there being a right angle drive 8 between shaft 7 and propeller 3, and a right angle drive 9 between shaft 7 and propeller 4. Shaft 7 runs through a gear box 10 in which it is suitably supported by bearings 11 and the shaft may further be supported in bearings 12 along the shaft should the span of the shaft require this additional support. The central part of the shaft 7 is provided with a bevel gear 13 with which is meshed a bevel gear 14, the gears 13 and 14 comprising a right angle drive and the gear 14 being secured to a longitudinal shaft 16 extending in a downward direction as viewed in the drawing. This shaft 16 may be supported in intermediate bearings 12 and may pass through a gear box 17 providing driving means for accessory apparatus. The lower end of shaft 16 enters a gear box 18 much like the gear box 10, the shaft 16 having a bevel gear 19 meshed with the bevel gear 20, the latter being mounted on a transverse shaft 22. This shaft extends transversely like the shaft 7 and drives the respective propellers 5 and 6 through right angle gear boxes 23 and 24.

On each side of the gear 13 on shaft 7, bevel gears 26 and 27 are mounted, meshed with bevel gears 28 and 29 connected to shafts 30 and 31 extending downwardly as shown. These shafts enter clutch units 32 which are driven from shafts 34 and 35 coaxial with shafts 30 and 31, the shafts 34 and 35 being driven by independent engines or powerplants 36 and 37. The lower transverse shaft 22 is similarly driven by powerplants 38 and 39 through clutches 32 and bevel gear sets 40 and 41.

The clutches 32 may be selectively operable to enable any engine to be connected or disconnected from the transmission system. Alternatively, these clutches may be of a centrifugally engaged overrunning type so that, should any one engine be shut down, the shafting system continues to operate as driven by the other engines. Should a stopped engine be restarted, it will then come up to the speed of the system and will contribute its share of power thereto.

The right and left ends of transverse shafts 7 and 22 carry the full power of any one engine to its nearest propeller. For instance, if all four engines are operating at substantially equal power, engine 36 will drive propeller 3, 37 will drive 4, 38 will drive 5 and 39 will drive 6. The central parts of shafts 7 and 22 and the longitudinal shaft 16 will be substantially unloaded but will continue to maintain precise speed coordination between the several propellers upon deviations in load level from one or more propellers or deviations in power available from one or more engines.

Should any one engine be shut down, for instance 36, there will be three-fourths of the full power available from the remaining engines and thus each propeller of the four shown can be driven only at a level to consume three-fourths of the available full power from one engine. With engine 36 shut down therefore, one-fourth of the power available from engine 37 will be transmitted to propeller 3 and three-fourths of its power will be transmitted to propeller 4. Engine 38 will furnish three-fourths of its power to propeller 5 and one-fourth to the connecting shaft 16. Engine 39 will furnish three-fourths of its power to the propeller 6 and one-fourth to the shaft 16. Thus, shaft 16 will carry one-half of the full power of one engine when one engine is inoperative. If the system is designed to operate only with three engines or four engines, the shaft 16 may be designed to transmit only one-half of the full power of one engine and thus may be lightened and reduced in size substantially as compared with the outer ends of shafts 7 and 22 which must, of course, carry the fully power of any one engine.

Assuming the design permits operation with two engines shut down and two operating, if two engines, such as 36 and 38 are shut down so that each propeller may operate at only one-half load, engine 37 will provide one-half of its power to each of propellers 8 and 9 and engine 39 will provide one-half of its power to each of propellers 5 and 6. Shaft 16 will be substantially unloaded.

Another feature of the arrangement shown includes the operation of the propellers at a rotational speed substantially less than that of any one engine, thus, the gearing 26, 28; 27, 29; 40, 41 comprises reduction gearing whereby the shafts 7 and 22 operate at a lesser r.p.m. than that of the engines. Likewise, the right angle drives 8, 9, 23 and 24 provide further reduction gearing so that the propeller speeds are less than the speeds of the shafts 7 and 22. This allows the shafts 7, 22 and 16 to be designed for relatively high-speed, low-torque operation with consequent weight reduction.

FIG. 2 shows another configuration of the invention, the same in principle as that already described. Here, however, the propellers 3 and 5, are interconnected by a longitudinal shaft 44 and the propellers 4 and 6 are interconnected by a longitudinal shaft 46. Reduction gears 47 are interposed between each of said shafts and the several propellers. Engine 36 is geared at 48 to drive shaft 44 through a clutch 32. Similarly, engine 38 is geared and clutched to the lower part of the shaft 44, engine 37 is geared and clutched to the upper part of shaft 46 and engine 39 is geared and clutched to the lower part of shaft 46. Thus, each engine, while all are operating, will drive its adjacent propeller in close-coupled relation. The two shafts 44 and 46 are drivably interconnected by a transverse shaft 50 through bevel gearing 51 at each end thereof.

In general, shaft 44 of FIG. 2 corresponds to shaft 7 of FIG. 1; shaft 46 of FIG. 2 corresponds to shaft 22 of FIG. 1 and shaft 50 of FIG. 2 corresponds to shaft 16 of FIG. 1.

The choice of the shafting configuration between FIG. 1 or 2, or some other variation, depends primarily upon the system with which the power transmission array is to be used but the principles involved remain essentially the same.

While we have shown and described our invention, it is to be understood that various modifications and changes may be made, and that it may be applied in different forms. The scope of the invention may be ascertained by reading the appended claims.

I claim:

1. In a powerplant and propeller system for aircraft including two laterally spaced forward propellers and two laterally spaced rearward propellers, all the respective propeller axes lying in substantially fore-and-aft planes, a transverse power shaft from one forward propeller to the other, a transverse power shaft from one rearward propeller to the other, angle drive gearing from each transverse shaft to respective propellers, a longitudinal power shaft of less load carrying capacity than each of the transverse shafts extending from substantially the middle of the forward transverse shaft to substantially the middle of the rearward transverse shaft, angle drive gearing between the ends of said longitudinal shaft and respective transverse shafts, and an engine drivably geared to each transverse shaft portion between a propeller and said longitudinal shaft.

2. In a mechanical power distribution system, in combination, a plurality of four driven devices each disposed at a corner of a four-sided figure, line shafting drivably joining a first and second adjacent device, line shafting drivably joining a third and fourth device, a single run of line shafting of less load carrying capacity than each of the aforesaid line shaftings and associated gearing drivably joining said first two line shaftings substantially at their mid portions, a plurality of four prime movers each having a one-way output driving clutch, each clutch being drivably connected with that portion of line shafting adjacent respective driven devices, none of said line shaftings having a power driving capacity in excess of that required for the power of a single prime mover, said interconnecting line shaftings being adapted to provide uniform power distribution to said four driven devices from any two, three or four of the operating prime movers.

3. In a mechanical power distribution system, in combination, parallel line shafts, a line shaft of less load carrying capacity than each of the parallel line shafts, normal to said parallel shafts and substantially midway of their lengths, gearing connecting said normal shaft with respective parallel shafts, a plurality of four driven devices, each disposed at and driven by an end of one of said parallel shafts, a gear connection on each of said parallel shafts on each side of said normal shaft, there being accordingly four such gear connections, a plurality of four powerplants, a one-way clutch at the output of each powerplant, and a drive shaft from each said clutch to one of said gear connections, all said shafting having a design power capacity of not more than that required for the full power of one powerplant.

References Cited in the file of this patent

UNITED STATES PATENTS

| 1,417,884 | Bernier | May 30, 1922 |
| 1,747,334 | Sundstedt | Feb. 18, 1930 |
| 2,462,824 | Zimmerman | Feb. 22, 1949 |
| 2,494,090 | Gwinn | Jan. 10, 1950 |
| 2,540,404 | Neale | Feb. 6, 1951 |
| 3,037,721 | Stefanutti | June 5, 1962 |

FOREIGN PATENTS

| 23,883 | Great Britain | 1914 |
| 538,046 | Great Britain | July 17, 1941 |
| 409,358 | Italy | Feb. 13, 1945 |